United States Patent
Tseng

(10) Patent No.: US 8,081,618 B2
(45) Date of Patent: Dec. 20, 2011

(54) METHOD AND APPARATUS OF CONTINUOUS PACKET CONNECTIVITY ENHANCEMENT IN A WIRELESS COMMUNICATIONS SYSTEM

(75) Inventor: Li-Chih Tseng, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 978 days.

(21) Appl. No.: 12/003,028

(22) Filed: Dec. 19, 2007

(65) Prior Publication Data

US 2008/0144507 A1    Jun. 19, 2008

Related U.S. Application Data

(60) Provisional application No. 60/875,525, filed on Dec. 19, 2006, provisional application No. 60/877,164, filed on Dec. 27, 2006.

(51) Int. Cl.
*H04J 3/24* (2006.01)
(52) U.S. Cl. ...... 370/349; 370/252; 370/310.2; 370/328; 370/335; 370/342; 370/477; 455/68; 455/422.1; 455/515
(58) Field of Classification Search .......... 370/235, 370/236, 236.1, 236.2, 241.1, 252, 310.2, 370/320, 328, 329–339, 342, 349, 438, 441, 370/479, 524, 477; 455/422.1, 515, 68, 70, 455/103
See application file for complete search history.

(56) References Cited

U.S. PATENT DOCUMENTS

| | | | |
|---|---|---|---|
| 6,631,125 | B1 | 10/2003 | Longoni |
| 2001/0053140 | A1 | 12/2001 | Choi |
| 2006/0203856 | A1 | 9/2006 | Laroia |
| 2006/0268764 | A1 | 11/2006 | Harris |
| 2007/0177569 | A1* | 8/2007 | Lundby ............... 370/349 |
| 2008/0056229 | A1* | 3/2008 | Gholmieh et al. ...... 370/349 |
| 2008/0101280 | A1* | 5/2008 | Gholmieh et al. ...... 370/328 |
| 2011/0110245 | A1* | 5/2011 | Hannu et al. ............ 370/252 |

FOREIGN PATENT DOCUMENTS

| | | |
|---|---|---|
| CN | 1679364 A | 10/2005 |
| KR | 1020080049643 | 6/2008 |
| TW | 200623737 A | 7/2006 |

(Continued)

OTHER PUBLICATIONS

3GPP, 3GPP TR 25.903 v1.2.0—3rd Generation Partnership Project: Technical Specification Group Radio Access Network, Continuous Connectivity for Packet Data Users (Release 7), Nov. 2006, 3GPP.*

(Continued)

*Primary Examiner* — Aung S Moe
*Assistant Examiner* — Hoon J Chung
(74) *Attorney, Agent, or Firm* — Klein, O'Neill & Singh, LLP

(57) ABSTRACT

In order to improve continuous packet connectivity (CPC), the present invention provides a method of improving CPC for a user equipment (UE) in a wireless communications system. The method includes receiving the HS-PDSCHs indicated by a control information and decoding the data on the HS-PDSCHs according to the control information when detecting an HS-SCCH carrying the control information intended for the UE, and at the same time, receiving the HS-PDSCHs indicated by a specific control information and decoding the data on the HS-PDSCHs according to the specific control information when a specific operation is enabled.

10 Claims, 3 Drawing Sheets

FOREIGN PATENT DOCUMENTS

| | | |
|---|---|---|
| TW | 200625863 A | 7/2006 |
| TW | 200633442 A | 9/2006 |
| WO | 2005002269 A1 | 1/2005 |
| WO | 2006016212 A1 | 2/2006 |
| WO | 2006085800 A1 | 8/2006 |
| WO | 2006130741 A1 | 12/2006 |

OTHER PUBLICATIONS

3GPP TSG RAN WG1 Meeting #62-bis, R1-105756, TS 25.214, CR 0292, Oct. 11, 2010.*

3GPP TS 25.214 v.7.3.0 (Dec. 2006): 3GPP Technical Specification Group Radio Access Network; Physical layer procedures (FDD) (Release 7), 3GPP, Dec. 2006.*

3GPP TS 25.214 v.7.4.0 (Mar. 2007): 3GPP Technical Specification Group Radio Access Network; Physical layer procedures (FDD) (Release 7), 3GPP, Mar. 2007.*

3GPP TSG-RAN WG2 Meeting #56 R2-063567, "Introduction of DTX-DRX and HS-SCCH less in RRC" Nov. 6, 2006.

3GPP TSG-RAN WG2 Meeting #56 R2-063308, "Introduction of DTX-DRX and HS-SCCH less in MAC" Nov. 6, 2006.

3GPP TSG-RAN WG1 Meeting #47 R1-063560, "Support of CPC feature" Nov. 6, 2006.

Qualcomm Europe et al., "Introduction of DTX-DRX and HS-SCCH less in RRC", 3GPP TSG-RAN WG2 Meeting #56, Tdoc R2-063309, P4, P6, P37-P39, 3rd Generation Partnership Project, Nov. 10, 2006, URL: http://www.3gpp.org/ftp/tsg_ran/WG2_RL2/TSGR2_56/Documents/R2-063309.zip.

Qualcomm Europe, "TP for HS-SCCH-Iess operation for Continuous Packet Connectivity", 3GPP TSG-RAN WG1 #44bis, R1-060946, P1-P2, 3rd Generation Partnership Project, Mar. 31, 2006, URL: http://www.3gpp.org/ftp/tsg_ran/WG1_RL1/TSGR1_44bis/Docs/R1-060946.zip.

Qualcomm Europe: "TP on Reduced Complexity HS-SCCH-Iess Operation", 3GPP TSG-RAN WG1 #46, R1-062421, Aug. 28- Sep. 1, 2006, pp. 1-10, XP002594620, Tallinn, Estonia.

3GPP TR 25.903 V1.2.0, Technical Specification Group Radio Access Network: Continuous Connectivty for Packet Data Users, p. 127, Line 5-40.

I Office Action on corresponding foreign application (TvW 96148631) from TIPO dated May 16, 2011.

* cited by examiner

METHOD AND APPARATUS OF CONTINUOUS PACKET CONNECTIVITY ENHANCEMENT IN A WIRELESS COMMUNICATIONS SYSTEM

CROSS REFERENCE TO RELATED APPLICATIONS

This application claims the benefit of U.S. Provisional Application No. 60/875,525, filed on Dec. 19, 2006 and entitled "Method and Apparatus for Improving Continuous Packet Connectivity (CPC)" and the benefit of U.S. Provisional Application No. 60/877,164, filed on Dec. 27, 2006 and entitled "Method and Apparatus for improving downlink DRX", the contents of which are incorporated herein by reference.

BACKGROUND OF THE INVENTION

1. Field of the Invention

The present invention relates to a method and related apparatus for improving continuous packet connectivity (CPC) for a user equipment in a wireless communications system, and more particularly, to a method and related apparatus for improving effects of CPC.

2. Description of the Prior Art

The third generation (3G) mobile telecommunications system has adopted a Wideband Code Division Multiple Access (WCDMA) wireless air interface access method for a cellular network. WCDMA provides high frequency spectrum utilization, universal coverage, and high quality, high-speed multimedia data transmission. The WCDMA method also meets all kinds of QoS requirements simultaneously, providing diverse, flexible, two-way transmission services and better communication quality to reduce transmission interruption rates. Through the 3G mobile telecommunications system, a user can utilize a wireless communications device, such as a mobile phone, to realize real-time video communications, conference calls, real-time games, online music broadcasts, and email sending/receiving. However, these functions rely on fast, instantaneous transmission. Thus, targeting at the third generation mobile telecommunication technology, the prior art provides High Speed Package Access (HSPA) technology, which includes High Speed Downlink Package Access (HSDPA) and High Speed Uplink Package Access (HSUPA), to increase bandwidth utility rate and package data processing efficiency to improve uplink/downlink transmission rate.

For HSDPA and HSUPA, the 3rd Generation Partnership Project (3GPP) provides a continuous packet connectivity (CPC) protocol specification, which includes features that, for user equipments (UEs) in CELL_DCH state, aim to significantly increase the number of packet data users for a cell, reduce the uplink noise rise and improve the achievable download capacity for VoIP. For an HSDPA UE, the UE can work in a special mode, HS-SCCH less operation, included in CPC. Under this mode, a high speed shared control channel (HS-SCCH) is not transmitted with the first hybrid automatic repeat request (HARQ) transmission. In the HS-SCCH less operation, the UE receives a high speed physical downlink shared channel (HS-PDSCH) according to required control signals received when the HS-SCCH less operation is enabled, such as "channelization-code-set", "modulation scheme", "transport-block size", "UE identity" and etc., for reducing HS-SCCH overhead for a HARQ process, thereby reducing UE power consumption.

For a detailed procedure for receiving the HS-SCCH, please refer to related communications protocol specification of 3GPP. If the UE did not detect consistent control information intended for this UE on any of the HS-SCCHs in the HS-SCCH set (the maximum size of the HS-SCCH set is 4) in the immediately preceding subframe (n−1), the UE shall in sub-frame n monitor all HS-SCCHs in the HS-SCCH set. On the other hand, if the UE did detect consistent control information intended for this UE in the immediately preceding subframe (n−1), it is sufficient in sub-frame n to only monitor the same HS-SCCH used in the immediately preceding sub-frame (n−1). This rule also applies in the HS-SCCH less operation.

If a UE detects that one of the monitored HS-SCCHs in sub-frame n carries consistent control information intended for this UE, the UE shall start receiving the HS-PDSCHs indicated by this consistent control information and perform decoding procedure. In addition, a cyclic redundancy check (CRC) in the last of each subframe of the HS-SCCH is utilized for verifying the UE identity and checking whether the decoding is successful. If CRC of the HS-SCCH is OK, that means the HS-SCCH subframe has been successfully received, otherwise, the HS-SCCH subframe has not been successfully received. When CRC of the HS-SCCH is failed, the information received on the HS-SCCH and the HS-PDSCH will be discarded.

As mentioned previously, in the HS-SCCH less operation, the UE receives and decodes information on the HS-PDSCH according to the control signals received when the HS-SCCH less operation is enabled whether the UE identity is correct. However, when the UE detects that one of the monitored HS-SCCHs in sub-frame n carries consistent control information intended for this UE, the UE starts receiving the HS-PDSCHs indicated by this consistent control information and performs decoding procedure. In this situation, the UE does not check whether the HS-SCCH less operation is enabled, and the UE does not decode information on the HS-PDSCH according to the control signals received when the HS-SCCH less operation is enabled. Finally, the UE may discard the information on the HS-SCCH and the HS-PDSCH because CRC of the HS-SCCH is failed. In fact, the information may be decoded successfully according to the control signals received when the HS-SCCH less operation is enabled and is not discarded.

In a word, in the prior art, when the UE detects that one of the monitored HS-SCCHs consistent control information intended for this UE, the UE starts receiving the HS-PDSCHs indicated by this consistent control information and performs decoding procedure, at the same time, the UE does not check whether the HS-SCCH less operation is enabled. The UE may lose the chance to decode the received information successfully according to the control signals received when the HS-SCCH less operation is enabled. Therefore, the effects of CPC are reduced.

SUMMARY OF THE INVENTION

The present invention provides a method and related apparatus for improving CPC for a UE in a wireless communications system.

The present invention discloses a method of improving CPC for a UE in a wireless communications system. The method includes receiving the HS-PDSCHs indicated by a control information and decoding the data on the HS-PD-SCHs according to the control information when detecting an HS-SCCH carrying the control information intended for the UE, and at the same time, receiving the HS-PDSCHs indicated by a specific control information and decoding the data on the HS-PDSCHs according to the specific control information when a specific operation is enabled.

The present invention further discloses a communications device of a wireless communications system utilized for improving CPC. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes receiving the HS-PDSCHs indicated by a control information and decoding the data on the HS-PDSCHs according to the control information when detecting an HS-SCCH carrying the control information intended for the communications device, and at the same time, receiving the HS-PDSCHs indicated by a specific control information and decoding the data on the HS-PDSCHs according to the specific control information when a specific operation is enabled.

The present invention further discloses a method of improving transmission efficiency for a UE in a wireless communications system. The method includes receiving a shared channel indicated by a control information and decoding the data on the shared channel according to the control information when detecting a first control channel carrying the control information intended for the UE, and at the same time, receiving the shared channel indicated by a specific control information and decoding the data on the shared channel according to the specific control information when a specific operation is enabled, wherein the specific operation comprises receiving the shared channel without monitoring a second control channel.

The present invention further discloses a communications device of a wireless communications system utilized for improving transmission efficiency. The communications device includes a control circuit, a processor and a memory. The control circuit is used for realizing functions of the communications device. The processor is installed in the control circuit and used for executing a program code to command the control circuit. The memory is installed in the control circuit and coupled to the processor, and used for storing the program code. The program code includes receiving a shared channel indicated by a control information and decoding the data on the shared channel according to the control information when detecting a first control channel carrying the control information intended for the communications device, and at the same time, receiving the shared channel indicated by a specific control information and decoding the data on the shared channel according to the specific control information when a specific operation is enabled, wherein the specific operation comprises receiving the shared channel without monitoring a second control channel.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
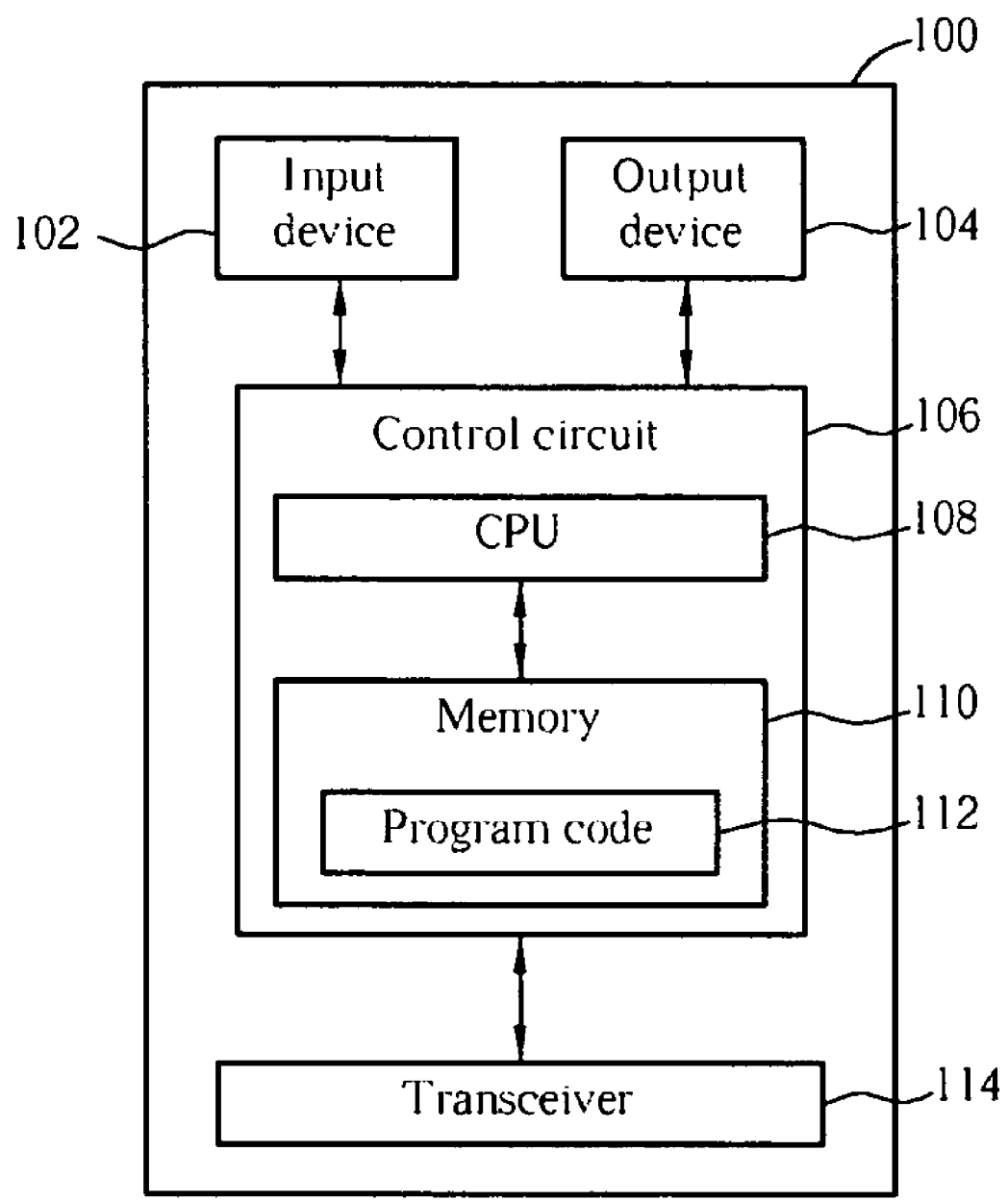
FIG. 1 is a functional block diagram of a communications device.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3. Preferably, the communications device 100 is utilized in a high speed package access (HSPA) system of the third generation (3G) mobile communications system, supporting continuous packet connectivity (CPC).

Figure 2:
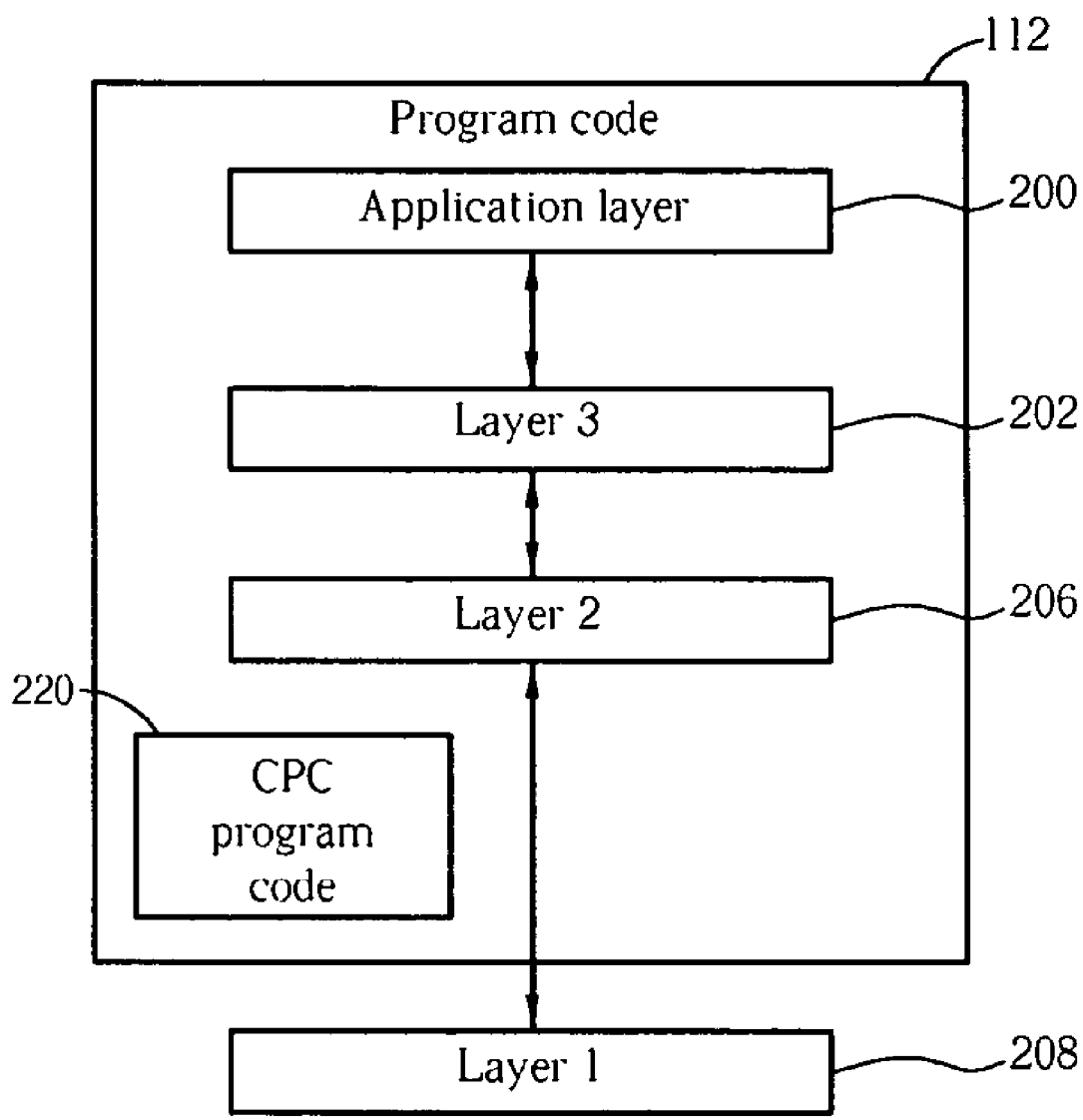
FIG. 2 is a diagram of the program code shown in FIG. 1.

Please continue to refer to FIG. 2. FIG. 2 is a diagram of the program code 112 shown in FIG. 1. The program code 112 includes an application layer 200, a Layer 3 202, and a Layer 2 206, and is coupled to a Layer 1208. The Layer 3 202 is used for performing radio resource control (RRC). The Layer 2 206 is used for performing radio link control (RLC), and the Layer 1208 is a physical layer.

In a procedure for receiving the HS-SCCH, if a UE detects that one of the monitored HS-SCCHs carries consistent control information intended for this UE, the UE shall start receiving the HS-PDSCHs indicated by this consistent control information and perform decoding procedure. In this situation, the UE does not check whether the HS-SCCH less operation is enabled, therefore, the UE may lose the chance to decode the first transmission according to the default control signals when the HS-SCCH less operation is enabled. As a result, the effects of CPC are reduced.

Figure 3:
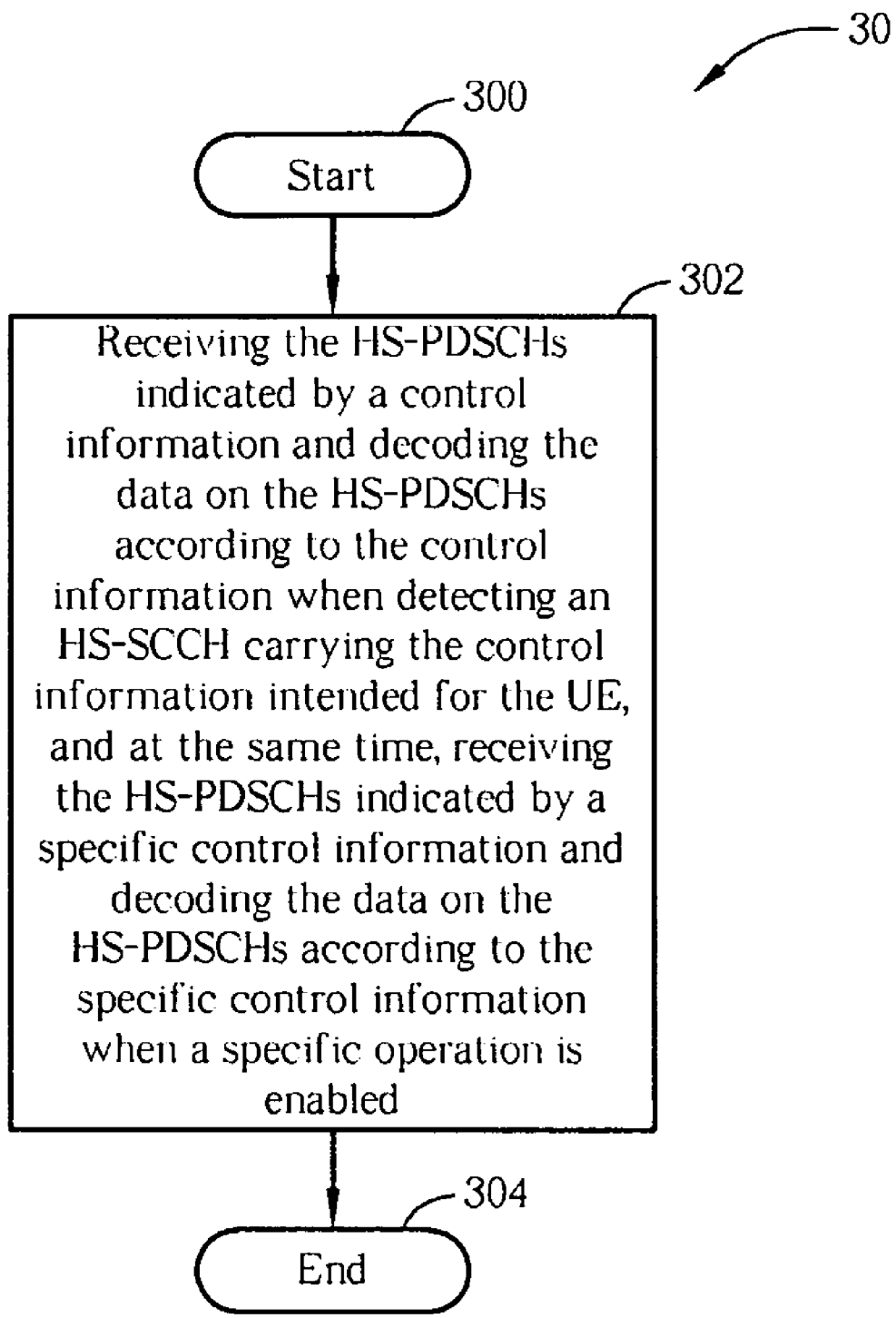
FIG. 3 is a flowchart diagram of a process according to an embodiment of the present invention.

The present invention provides a CPC program code 220 for improving CPC. Please refer to FIG. 3, which illustrates a schematic diagram of a process 30 according to an embodiment of the present invention. The process 30 is utilized for improving CPC for a UE in a wireless communications system. The process 30 can be compiled into the CPC program code 220. The process 30 includes the following steps:

Step 300: Start.
Step 302: Receiving the HS-PDSCHs indicated by a control information and decoding the data on the HS-PDSCHs according to the control information when detecting an HS-SCCH carrying the control information intended for the UE, and at the same time, receiving the HS-PDSCHs indicated by a specific control information and decoding the data on the HS-PDSCHs according to the specific control information when a specific operation is enabled.
Step 304: End.

According to the process 30, the embodiment of the present invention comprises not only decoding the data on the HS-PDSCHs according to the control information carried on the HS-SCCH, but also decoding the data on the HS-PDSCHs according to a specific control information, wherein the specific control information includes radio resource and coding scheme information. In process 30, the specific control information is preferably the control information sent by a base station in the wireless communications system when the HS-SCCH less operation is enabled, and is utilized for decoding the data of the first transmission under the HS-SCCH less operation.

In conclusion, the embodiment of the present invention enhances the probability of decoding the received information successfully, and prevents the loss of the first transmission in the HS-SCCH less operation from the failed cyclic redundancy check (CRC) of the HS-SCCH, so as to improve CPC.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of improving continuous packet connectivity (CPC) for a user equipment (UE) in a wireless communications system the method comprising:

receiving a first HS-PDSCHs indicated by a control information and decoding data on the first HS-PDSCHs according to the control information when detecting an HS-SCCH carrying the control information intended for the UE regardless of whether or not an HS-SCCH less operation is enabled, and when the HS-SCCH less operation is enabled, receiving at the same time a second HS-PDSCHs indicated by a specific control information and decoding data on the second HS-PDSCHs according to the specific control information.

2. The method of claim 1, wherein the specific control information is a default control information sent by a base station in the wireless communications system when the HS-SCCH less operation is enabled, for receiving the second HS-PDSCHs according to the default control information.

3. The method of claim 1, wherein the control information and the specific control information comprises radio resource and coding scheme information.

4. A communications device of a wireless communications system utilized for improving continuous packet connectivity (CPC) the communication device comprising:

a control circuit for realizing functions of the communications device;

a central processing unit installed in the control circuit for executing a program code to operate the control circuit; and a memory coupled to the central processing unit for storing the program code;

wherein the program code comprises:

receiving a first HS-PDSCHs indicated by a control information and decoding data on the first HS-PDSCHs according to the control information when detecting an HS-SCCH carrying the control information intended for the UE regardless of whether or not an HS-SCCH less operation is enabled, and when the HS-SCCH less operation is enabled, receiving at the same time a second HS-PDSCHs indicated by a specific control information and decoding data on the second HS-PDSCHs according to the specific control information.

5. The communications device of claim 4, wherein the specific control information is a default control information sent by a base station in the wireless communications system when the HS-SCCH less operation is enabled, for receiving the second HS-PDSCHs according to the default control information.

6. The communications device of claim 4, wherein the control information and the specific control information comprises radio resource and coding scheme information.

7. The method of improving transmission efficiency for a user equipment (UE) in a wireless communications system, and the method comprising:

receiving a shared channel indicated by a control information and decoding data on the shared channel according to the control information when detecting a first control channel carrying the control information intended for the UE regardless of whether or not an HS-SCCH less operation is enabled, and when the HS-SCCH less operation is enabled, receiving at the same time the shared channel indicated by a specific control information and decoding the data on the shared channel according to the specific control information, wherein the HS-SCCH less operation comprises receiving the shared channel without monitoring a second control channel.

8. The method of claim 7, wherein the control information and the specific control information comprise radio resource and coding scheme information.

9. A communications device of a wireless communications system utilized for improving transmission efficiency, the communications device comprising:

a control circuit for realizing functions of the communications device;

a central processing unit installed in the control circuit for executing a program code to operate the control circuit; and a memory coupled to the central processing unit for storing the program code;

wherein the program code comprises:

receiving a shared channel indicated by a control information and decoding data on the shared channel according to the control information when detecting a first control channel carrying the control information intended for the communications device regardless of whether or not an HS-SCCH less operation is enabled, and when the HS-SCCH less operation is enabled, receiving at the same time the shared channel indicated by a specific control information and decoding the data on the shared channel according to the specific control information, wherein the HS-SCCH less operation comprises receiving the shared channel without monitoring a second control channel.

10. The communications device of claim 9, wherein the control information and the specific control information comprise radio resource and coding scheme information.

* * * * *